2 Sheets—Sheet 1.

N. PALMER.
Rotary Gang-Plow.

No. 213,242. Patented Mar. 11, 1879.

Witnesses
Fred G. Dieterich
J. Walter Fowler

Inventor
Nelson Palmer
by DeWitt C. Allen
Attorney

2 Sheets—Sheet 2.
N. PALMER.
Rotary Gang-Plow.
No. 213,242. Patented Mar. 11, 1879.
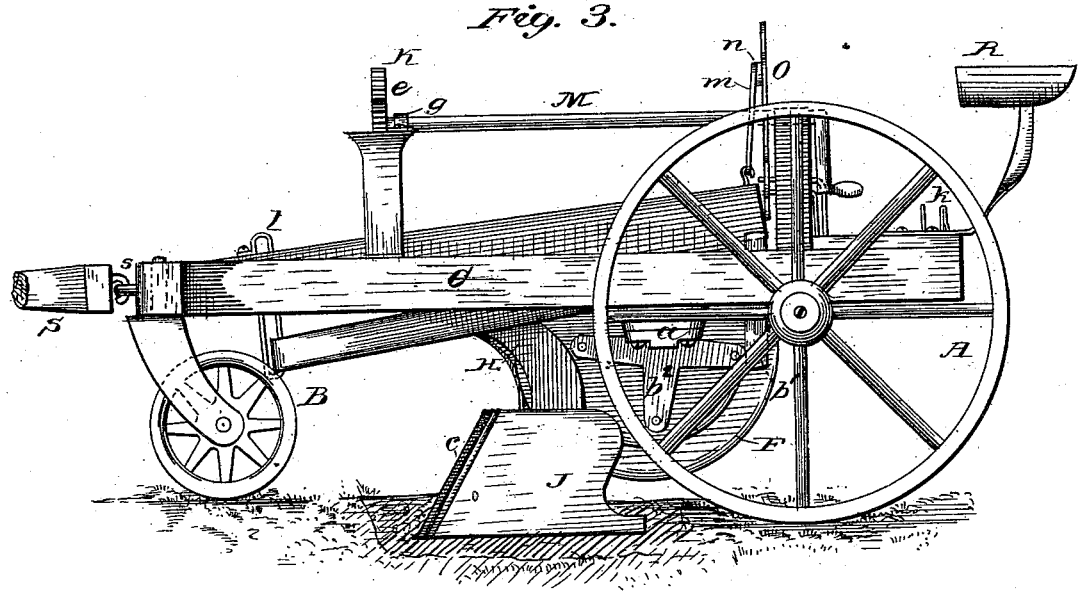
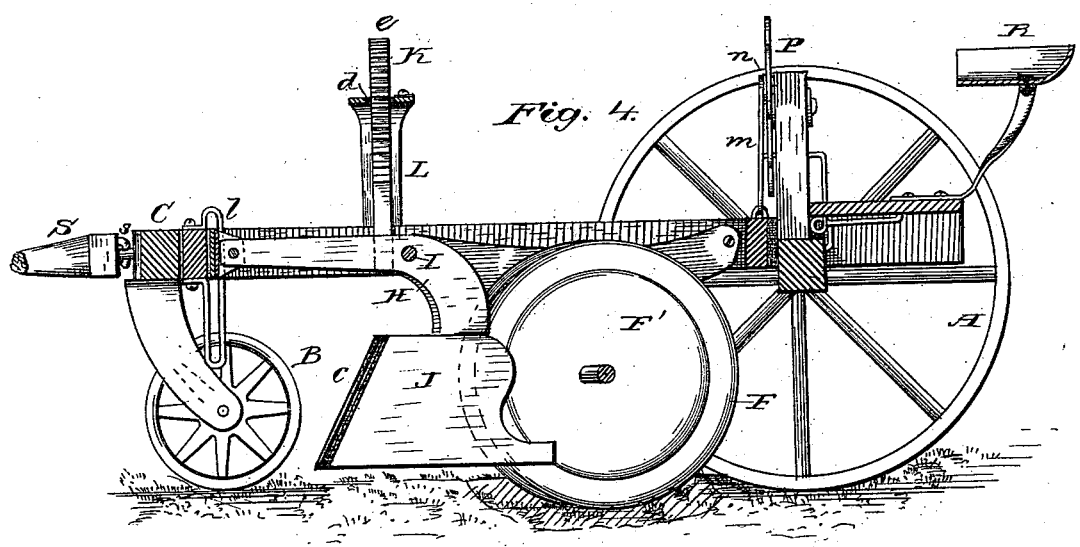
Witnesses
Fred G. Dieterich
F. Walter Fowler
Inventor
Nelson Palmer
by DeWitt C. Allen
Attorney

UNITED STATES PATENT OFFICE.

NELSON PALMER, OF NEW YORK, N. Y.

IMPROVEMENT IN ROTARY GANG-PLOWS.

Specification forming part of Letters Patent No. 213,242, dated March 11, 1879; application filed January 6, 1879.

*To all whom it may concern:*

Be it known that I, NELSON PALMER, of the city, county, and State of New York, have invented certain new and useful Improvements in Rotary Gang-Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improvement in wheel-plows, and more especially to the class of rotary disks or mold-board gang-plows.

Heretofore imperfections have existed and objections have been made to this style of plow, because they were not adapted to work in all kinds of soil, as in hard clay soil or other hard or stony or rooty ground, in which conditions the disks would not penetrate the soil or remove these obstructions, but would pass over them, and thus perform their work imperfectly.

My invention is intended to obviate these defects by placing before each disk and in close proximity to it a small plow or colter share, detached from the disk and independently adjustable, which is adapted to cut and clear its way through all obstructions ordinarily met with in plowing.

It further consists in the application of disks with convex centers on their front or earth-turning surfaces to a shaft passing through said disks, which prevents the soil, in process of turning, from clogging around the shaft by deflecting it before it reaches the shaft or center of the disk. This convexity serves also as a brace, by forming a wide and firm bearing to support the disk in sustaining the pressure of turning the soil firmly upon the shaft.

By this construction of the disks or mold-boards the arranging of them upon a shaft passing through their centers becomes practicable, as it prevents clogging and braces the disks firmly by forming a broad base of support upon the shaft, all of which will be hereinafter more fully described.

Figure 1:
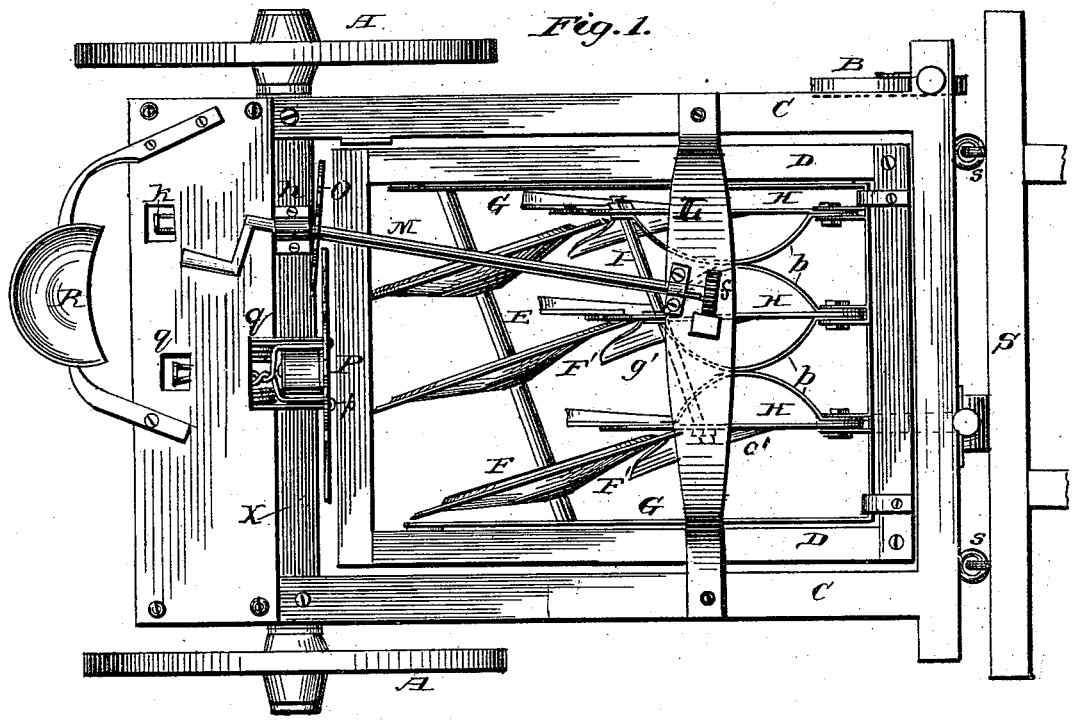
Figure 2:
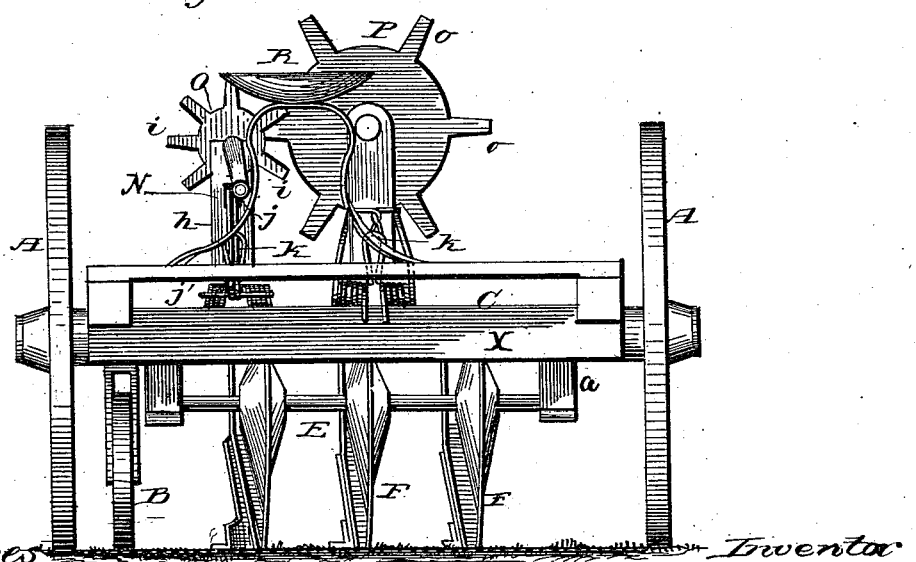

In the accompanying drawings, Figure 1 is plan view of my invention. Fig. 2 is a rear view thereof. Fig. 3 is a side view, and Fig. 4 a longitudinal section thereof.

In this construction there is mounted upon suitable bearing-wheels A A and B B a rectangular frame, C. Within this frame and near the front end is journaled or otherwise secured a second frame, D, with guides $b'$ at the rear end. In bearings $a$, depending from this secondary frame or the side beams thereof, is journaled or otherwise secured a shaft, E, which is allowed to revolve freely. Upon this shaft are suitably mounted one or more disks, F, with, or may be without, convex centers F' on their front or earth-turning surfaces, for the purpose of turning and pulverizing the soil.

Within the secondary frame D, and hinged to it at or near the rear end thereof, is a third frame, G, to the front end of which are hinged, pivoted, or otherwise secured, plow-beams H. These beams may be hinged or attached to render them independently adjustable; but I prefer to connect them together with a shaft, I, as shown, with or without braces $b$, as may be preferred. To the lower end of these beams may be attached small plows or colter-shares J immediately in front of the co-operating disks F, said shares being provided with nearly perpendicular and horizontal edges $c\ c'$. These edges are sharpened to cut their way through and open the way for the disks, thus causing them to operate efficiently in turning all the varieties of soil.

As shown, there is secured to the center one of the beams H a bar or rack, K, which passes up through a slot, $d$, in the semicircular or arched brace L. This bar is provided with teeth $e$, or their equivalents, which engage a cog-wheel or pinion, $f$, journaled in suitable bearings $g$, secured to the arched or semicircular brace. The shaft M, on which this pinion is firmly secured, extends rearward, and is likewise journaled in bearings $h$ upon an upright, N, mounted on the axle X, or secured to the frame C at any desired point. Near the rear end and upon this shaft is securely attached a wheel, O, having projecting arms $i$, which engage a self-locking latch, $j$, passing through the upright or journal-support, which may be acted upon by the foot-lever or projection $k$ to release the said wheel.

If found desirable, a chain and segment, or any other convenient method of raising and lowering the disks or shares, may be substituted for the present devices.

The slotted bearings or guides $l$, attached to the front end of the frame G, determine the limits of the elevation and depression of the beams and shares.

To the rear end of the secondary frame D is hinged a rod or pitman, $m$, which extends upward, and is attached to a pin or projection, $n$, at or near the base of the arms $o$ on the wheel P, by which it is operated. By rotating this wheel or crank the disks are raised or lowered or held in any desired position by self-locking projections $p$, which may be operated by the foot-lever $q$ to disengage the wheel P.

The foot-levers $k$ and $q$ are within the reach of the operator when occupying the seat R, as also the arms $i$ and $o$ of the wheels, by means of which the disks and shares may be elevated or depressed separately or together, as may be desired, and thereby the disks and the shares may be used separately or together in cultivating the soil. Not only by this adjustment can the disks or shares be used separately, but they may act as aids to each other in any degree desired.

The shares may penetrate deeper into the soil than the disks, or the disks penetrate deeper into the soil than the shares, or either may be used alone for pulverizing or marking the ground at pleasure; and by this adjustment relatively to each other of the disks and the shares it practically unites or combines the convenience, utility, and efficiency of several implements in one.

The tongues S S are readily removed or attached to the loops $s\,s$, to which they are hinged.

Having thus described the object and nature of my invention, what I claim, and desire to secure by Letters Patent, is—

1. In an earth-turning machine, one or more shares immediately preceding, but detached from and adjustable independently of, one or more disks, substantially as shown and described.

2. In an earth-turning machine, a series of concave disks, with convex centers on their front or earth-turning surfaces, attached to a separate frame and adjustable independently of shares or cutting devices which immediately precede them, substantially as and for the purpose set forth.

3. In an earth-turning machine, a series of shares or cutting devices pivoted or hinged to the front end of a frame, which is pivoted at its rear end to an adjustable disk-frame, by which series of adjusting devices the shares or cutting devices may be elevated or depressed in a horizontal position, substantially as shown and described.

4. In an earth-turning machine, a series of disks attached to an adjustable frame, and a series of shares or cutting devices attached to a separate adjustable frame, in combination with devices for adjusting said frames at different degrees of elevation separately or together, or relatively to each other, substantially as and for the purpose shown and described.

5. In an earth-turning machine, the principal frame, C, secondary frame, D, and the third frame, G, in combination with the slotted bearings or guides $l$ and the guides $b'$, all constructed and operating substantially as set forth.

In testimony that I claim the foregoing as my own I affix my signature in presence of two witnesses.

NELSON PALMER.

Witnesses:
JOHN A. ELLIS,
H. J. ENNIS.